United States Patent [19]

Dow et al.

[11] Patent Number: 4,880,655

[45] Date of Patent: Nov. 14, 1989

[54] CHOCOLATE SYRUP AND METHOD OF MAKING SAME

[76] Inventors: Douglas Dow, 1080 Iroquois, Detroit, Mich. 48214; Patricia J. Flanagan, 18917 Highlite Dr., S., Mt. Clemens, Mich. 48043

[21] Appl. No.: 760,162

[22] Filed: Jul. 29, 1985

[51] Int. Cl.$^4$ ................................................. A23L 1/08
[52] U.S. Cl. .................................... 426/593; 426/631; 426/653; 426/658
[58] Field of Search ................. 426/658, 631, 593, 653

[56] References Cited

U.S. PATENT DOCUMENTS 1,786,831 12/1930 Dellenbarger .......................... 426/3

OTHER PUBLICATIONS

Lord, Everybody's Cookbook, Harcourt Brace and Co., N.Y., 1937, pp. 730, 438, 726–727.
Beale et al., Mixer & Blender Cookery, Pitman Pub. Co., 1972, London, p. 89.
Hoshijo, Kathy Cooks Naturally, Bantam Books, N.Y., 1981, pp. 53–56, 93, 96, 431, 523.
Hunter, The Natural Foods Cookbook, Jove Books, N.Y., 1961, pp. 42, 340, 307.
Brooks, The Forget-About-Meat Cookbook, Rodale Press Inc., Emmaus PA, 1974, pp.
Berolzheimer, 250 Luscious Refrigerator Desserts, Consolidated, Chicago, 1951, pp. 47–48.
Renwick, The Real Food Cookbook, Zondervan Pub. House, Grand Rapids, Mich., 1978, pp. 24, 26, 245–247, 249.

*Primary Examiner*—Jeanette Hunter
*Attorney, Agent, or Firm*—Brooks & Kushman

[57] ABSTRACT

A chocolate syrup sweetened by honey which allows the syrup to be kept at room temperature even after opening. An approximate ratio of 8 parts honey to 1 part cocoa by weight is maintained in the formulations. When these are mixed together, water is also added which will vary from between 4 to 25% by weight of the total mixture. A flavoring, in less than 2% by weight of the syrup, can also be mixed into the syrup.

15 Claims, No Drawings

CHOCOLATE SYRUP AND METHOD OF MAKING SAME

BACKGROUND OF THE INVENTION

The invention concerns a chocolate syrup that can be readily applied to ice cream and mixed with drinks while not requiring refrigeration.

There are a number of commercially available chocolate flavored syrups which are marketed under such trade names as HERSHEY'S and NESTLE'S; however, these all suffer the disadvantage of having to be refrigerated upon opening and further make use of numerous additives. The inconvenience of having to refrigerate the syrups discourages their use as does the increasing recognition of the desire to avoid additives in foods for better health.

SUMMARY OF THE INVENTION

Described is a chocolate syrup which can be made from three natural ingredients, with perhaps a flavoring added. The ingredients are: cocoa, honey and water. When these are combined by maintaining an approximate 8 to 1 ratio between the honey and the cocoa with water added varying between 4 and 25% depending on the desired use of the end product, a chocolate syrup will result which not only tastes good but is easily usable and does not need refrigeration.

DESCRIPTION OF PREFERRED EMBODIMENTS

It has been found that honey, chocolate and water can be mixed in such a way to yield a syrup which may be added to milk, ice cream and the like for flavor. For a good taste and to maintain the storage properties of the honey so that the resulting composition requires no refrigeration, it has been found that the honey should be the primary ingredient of the syrup, preferably within the range of 66-87% by weight. Cocoa and water make up the other two ingredients of the syrup although a flavoring might be added for a different taste. The cocoa should range from 9-11% by weight when a high-fat cocoa is used. This cocoa is preferably of the Dutch process for better flavoring. The water to be mixed in can vary from 4-25%. At the higher end of this range, the syrup that will be yielded which easily mixes with milk, dissolving almost instantly to give a chocolate drink. Towards the lower end of the water range, a thicker syrup will result which is better suited as a topping for ice cream.

The honey is of a good grade which is often referred to in the trade as "A" or "Number 1" or "Fancy". The preferred taste has been achieved using clover honey. Although lower grades of honey might be used, there runs the risk of requiring refrigeration of the end product or a possible crystallization of the honey so not to give a smooth syrup taste.

The process for making the honey consists of mixing the ingredients of honey, cocoa and water at appropriate percentages within the range indicated above. The honey should be mixed first with either the cocoa or the water. If the cocoa and water are mixed first, clumping occurs reducing the effectiveness of the final mix. After the honey and one of the other two ingredients has been mixed, the third ingredient is added. If the flavoring is to be added, it is added at this time. The resulting syrup can then be bottled and stored in a non-refrigerated condition even after opening for use. This allows the consumer to store the syrup on the kitchen table or for a restaurant owner to keep the syrup in ready reach of his customers.

A preferred mixture for use on ice cream results when a syrup is made from high grade honey that is 85% of the ingredients by weight to which the high-fat cocoa (10.6% by weight) is added. After thoroughly mixed, water at 4.4% by weight is added. The resultant mixture gives a thick, good tasting syrup that is easily applied to ice cream.

The preferred mixture for making chocolate milk with the syrup of this invention is to take high grade honey in a proportion that is 80% of the weight of the ingredients and mix it with high-fat cocoa which is 10% by weight of the ingredients. Again, an 8 to 1 ratio is maintained between these two ingredients. When they are thoroughly mixed, water in the amount of 10% by weight is added. This thinner syrup easily dissolves in milk to give a chocolate milk. It has been found that minimal stirring is necessary for this to dissolve in the milk. This proportion of ingredients still gives a suitable syrup for toppings on ice cream and the like.

The use of flavorings is also possible. A minimal percentage of the mixture might be an ingredient to give a slightly different taste. This additional ingredient should be kept to less than 2% by weight of the syrup. All natural liquid mint extract and pure almond extract are flavorings that have successfully been used.

We claim:

1. Chocolate syrup having the following composition (in weight percent);
   top grade honey 66-87;
   high-fat processed powdered cocoa 9-11;
   water 4-25.

2. Chocolate syrup having the following composition (in weight percent);
   top grade honey 66-87;
   high-fat cocoa 9-11;
   water 4-25;
   flavoring not greater than 2%.

3. Chocolate syrup of claim 1 wherein the ratio between the honey and cocoa by weight is 8 to 1.

4. Chocolate syrup of claim 2 wherein the ratio between the honey and cocoa by weight is 8 to 1.

5. The method of claim 3 wherein a ratio between the honey and cocoa to be mixed is maintained at 8 to 1 by weight.

6. A method for making chocolate syrup comprising mixing good or better grade honey with finely sifted cocoa and water by first mixing the honey with either the cocoa or the water but not both and then adding the third ingredient.

7. The method of claim 6 when the ingredients to be mixed are in the following proportions (in weight percent):
   top grade honey 66-87;
   high-fat cocoa 9-11;
   water 4-25.

8. The method of claim 6 when the ingredients to be mixed are in the following proportions (in weight percent):
   top grade honey 80;
   high-fat cocoa 10;
   water 10.

9. The method of claim 6 when the ingredients to be mixed are in the following proportions (in weight percent):

top grade honey 72;
high-fat cocoa 9;
water 19.

10. The process of claim 6 wherein the cocoa is Dutch-process cocoa.

11. The process of claim 6 wherein after mixing said ingredients a flavor is mixed into the resultant mixture.

12. The process of claim 6 wherein the honey is clover honey.

13. The method of claim 7 including the additional step of passing 100% of the cocoa powder to be mixed through a wet sieving of no more than 70 microns.

14. The method of claim 13 wherein a ratio between the honey and the cocoa to be mixed is maintained at 8 to 1 by weight.

15. The method of claim 14 wherein the cocoa powder being mixed has a butterfat content of not less than 20%.

* * * * *